United States Patent
Hong et al.

(10) Patent No.: US 9,185,365 B2
(45) Date of Patent: Nov. 10, 2015

(54) APPARATUS AND METHOD FOR CONTROLLING SENSOR NODE USING VIBRATION SENSOR AND MAGNETIC SENSOR

(75) Inventors: Sang Gi Hong, Daejeon (KR); Nae Soo Kim, Daejeon (KR); Yong Hyun Kim, Seoul (KR); Noh Bok Lee, Seoul (KR)

(73) Assignees: ELECTRONICS AND TELECOMMUNICATIONS RESEARCH INSTITUTE, Daejeon (KR); AGENCY FOR DEFENSE DEVELOPMENT, Daejeon (KR)

( * ) Notice: Subject to any disclaimer, the term of this patent is extended or adjusted under 35 U.S.C. 154(b) by 458 days.

(21) Appl. No.: 13/268,299

(22) Filed: Oct. 7, 2011

(65) Prior Publication Data
US 2012/0089373 A1   Apr. 12, 2012

(30) Foreign Application Priority Data

Oct. 7, 2010 (KR) .................. 10-2010-0097757
May 13, 2011 (KR) .................. 10-2011-0045216

(51) Int. Cl.
  *H04B 15/00* (2006.01)
  *H04N 7/18* (2006.01)
(52) U.S. Cl.
  CPC ..................... *H04N 7/185* (2013.01)
(58) Field of Classification Search
  CPC ....... G01C 21/08; G01S 13/42; G01S 13/867; F41G 3/02; F41G 3/06
  USPC ......................................... 702/190
  See application file for complete search history.

(56) References Cited

U.S. PATENT DOCUMENTS

| | | | |
|---|---|---|---|
| 5,953,683 A * | 9/1999 | Hansen et al. | 702/95 |
| 7,143,004 B2 * | 11/2006 | Townsend et al. | 702/153 |
| 7,474,254 B2 * | 1/2009 | White et al. | 342/74 |
| 8,275,544 B1 * | 9/2012 | Wells et al. | 701/501 |

(Continued)

FOREIGN PATENT DOCUMENTS

| | | |
|---|---|---|
| JP | 2006-078474 | 3/2006 |
| KR | 10-2009-0004245 | 1/2009 |

(Continued)

OTHER PUBLICATIONS

Don Tuite, "design FAQs Variable Gain Amplifiers", May 30, 2009, Analog Devices, http://web.archive.org/web/20090530074037/http://www.analog.com/static/imported-files/faqs/FAQ%20VGA%20FINAL%2005-08.pdf.*

*Primary Examiner* — Elias Desta
(74) *Attorney, Agent, or Firm* — Staas & Halsey LLP

(57) ABSTRACT

An apparatus and method for controlling a sensor node are provided that may calculate an azimuth angle and a slope of the sensor node using a 2-axis magnetic sensor and a 3-axis acceleration sensor, and may detect a target approaching the sensor node. The apparatus may include a calculation unit to calculate an azimuth angle and a slope of a sensor node, based on a magnetic values measured by a 2-axis magnetic sensor and a acceleration values measured by a 3-axis acceleration sensor; a sensor control unit to filter the magnetic values and the vibration values and to amplify the filtered magnetic values and the filtered vibration values, when the azimuth angle and the slope are calculated; and a detection unit to detect a target based on the amplified magnetic values and the amplified vibration values.

18 Claims, 3 Drawing Sheets

(56) References Cited

U.S. PATENT DOCUMENTS

2009/0204351 A1* 8/2009 Tamura .................... 702/85
2010/0244841 A1* 9/2010 Wang ...................... 324/333

FOREIGN PATENT DOCUMENTS

| KR | 10-2009-0012724 | 2/2009 |
| KR | 10-2010-0030890 | 3/2010 |

* cited by examiner

APPARATUS AND METHOD FOR CONTROLLING SENSOR NODE USING VIBRATION SENSOR AND MAGNETIC SENSOR

CROSS-REFERENCE TO RELATED APPLICATIONS

This application claims the benefit of Korean Patent Application No. 10-2010-0097757 and of Korean Patent Application No. 10-2011-0045216, respectively filed on Oct. 7, 2010 and May 13, 2011, in the Korean Intellectual Property Office, the disclosures of which are incorporated herein by reference.

BACKGROUND

1. Field of the Invention

The present invention relates to an apparatus and method for controlling a sensor node that may be installed in a predetermined place and may detect a target approaching the predetermined place, and more particularly, to a an apparatus and method for controlling a sensor node that may calculate an azimuth angle and a slope of the sensor node using a 2-axis magnetic sensor and a 3-axis acceleration sensor, and may detect a target approaching the sensor node.

2. Description of the Related Art

A sensor node may be installed in a predetermined place, and may be used to detect a target approaching the predetermined place. The sensor node may include various sensors, for example an acoustic sensor, a Pyroelectric Infrared Ray (PIR) sensor, a 2-axis magnetic sensor, and a 3-axis acceleration sensor, and may detect and identify a target. Additionally, the sensor node may include a radio antenna to transmit information, and may transmit information on the detected target using the radio antenna. The sensor node may be optionally distributed using an airplane or a gun, or installed manually by people in a region that requires detection of a target approaching the sensor node, and may then be operated.

Recently, to improve a target detection performance of the sensor node, there is an increasingly growing need to mount, in the sensor node, a peripheral device, such as a sector antenna or a radial direction correction antenna, and an additional sensor such as a camera.

However, a peripheral device, such as a sector antenna, needs to be aligned based on a direction. A direction and a slope of a sensor used to detect a predetermined direction, for example a camera, need to be corrected based on a direction and a slope of a place in which the sensor node is installed. In other words, when the peripheral device and the additional sensor are mounted in the sensor node, the sensor node may further require a compass sensor and a slope sensor.

Accordingly, there is a desire for a sensor node control method that may measure a direction and a slope of a sensor node using sensors mounted in the sensor node, and may align directions and slopes of the sensors based on the measured direction and the measured slope.

SUMMARY

An aspect of the present invention provides an apparatus and method for controlling a sensor node that may measure a direction and a slope of the sensor node using a 2-axis magnetic sensor and a 3-axis acceleration sensor, and may control directions and slopes of sensors in the sensor node to be aligned based on the measured direction and the measured slope.

Another aspect of the present invention provides an apparatus and method for controlling a sensor node that may detect vibration, and a change in a magnetic field around the sensor node using a 2-axis magnetic sensor and a 3-axis acceleration sensor, by calculating an azimuth angle and a slope of the sensor node, as well as, by determining whether to filter and amplify a magnetic values and a vibration value.

According to an aspect of the present invention, there is provided an apparatus for controlling a sensor node, including: a calculation unit to calculate an azimuth angle and a slope of a sensor node, based on magnetic values (X, Y axis) measured by a 2-axis magnetic sensor and a acceleration values (X, Y, Z axis) measured by a 3-axis acceleration sensor; a sensor control unit to filter the magnetic values and the vibration value and to amplify the filtered magnetic values and the filtered vibration value, when the azimuth angle and the slope are calculated; and a detection unit to detect a target based on the amplified magnetic values and the amplified vibration values.

According to another aspect of the present invention, there is provided a method for controlling a sensor node, including: calculating an azimuth angle and a slope of a sensor node, based on a magnetic values measured by a 2-axis magnetic sensor and a vibration values measured by a 3-axis acceleration sensor; filtering the magnetic values and the vibration values and amplifying the filtered magnetic values and the filtered vibration values, when the azimuth angle and the slope are calculated; and detecting a target based on the amplified magnetic values and the amplified vibration values.

EFFECT

According to embodiments of the present invention, it is possible to measure a direction and a slope of a sensor node using a 2-axis magnetic sensor and a 3-axis acceleration sensor, and to control directions and slopes of sensors in the sensor node to be aligned based on the measured direction and the measured slope.

Additionally, according to embodiments of the present invention, it is possible to detect vibration, and a change in a magnetic field around a sensor node, using a 2-axis magnetic sensor and a 3-axis acceleration sensor, by determining whether to filter and amplify a magnetic values and a vibration values depending on whether an azimuth angle and a slope of the sensor node are calculated.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
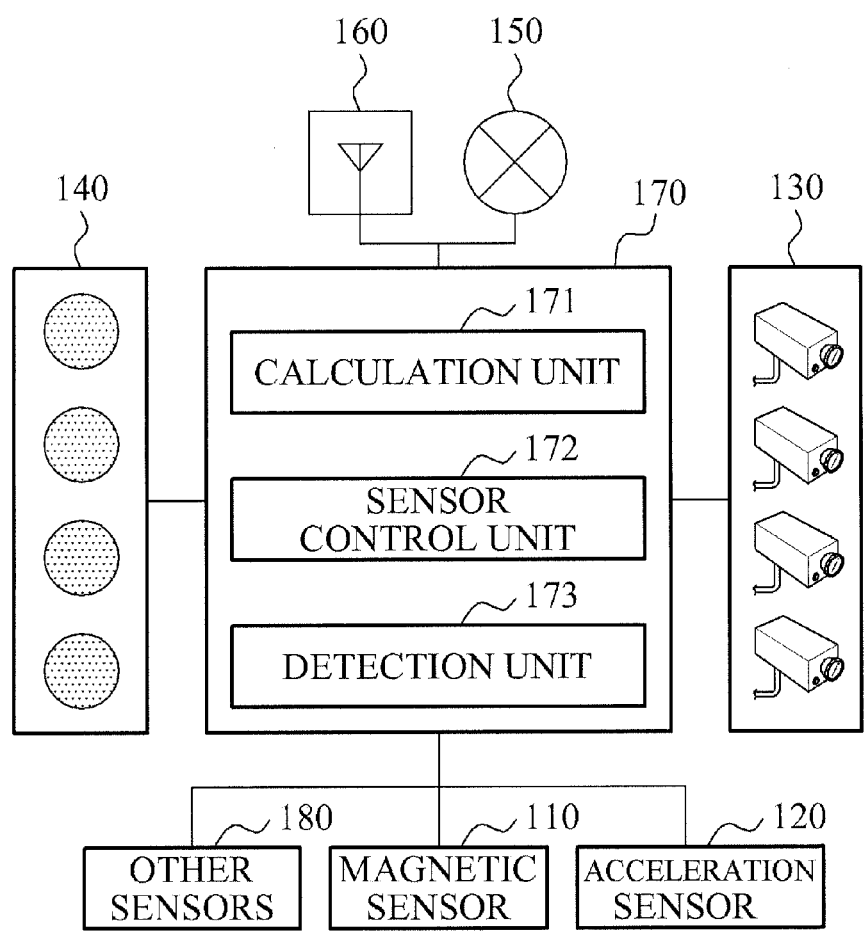
FIG. 1 is a block diagram illustrating a sensor node according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a sensor node according to an embodiment of the present invention.

Referring to FIG. 1, the sensor node may include a 2-axis magnetic sensor 110, a 3-axis acceleration sensor 120, a plurality of cameras 130, a plurality of Infrared Ray (IR) sensors 140, a sector antenna 150, a radial direction correction antenna 160, a sensor node control apparatus 170, and other sensors 180.

In the sensor node, Pyroelectric Infrared Ray (PIR) sensors may be used as the IR sensors 140. Additionally, as illustrated in FIG. 1, the sensor node may include four cameras 130 and four IR sensors 140, and may enable the four cameras 130 and four IR sensors 140 to detect different directions, so that all directions may be detected by the sensor node. Furthermore, the other sensors 180 may include, for example, sensors other than the 2-axis magnetic sensor 110, the 3-axis acceleration sensor 120, the cameras 130, the IR sensors 140, the sector antenna 150, and the radial direction correction antenna 160, and there is no limitation to type of sensors included in the sensor node.

For example, when a sensor node is initially installed or is moved, a position detection mode may be executed, an azimuth angle and a slope of the sensor node may be calculated, and sensors in the sensor node may be controlled based on the calculated azimuth angle and the calculated slope, so that the sensors may be optimized to an environment where the sensor node is located. In this example, when a target detection mode is executed, the sensor node may detect a target using the optimized sensors. Here, the target may include, for example, an invader, an animal, a vehicle, and the like.

The sensor node control apparatus 170 may include a calculation unit 171, a sensor control unit 172, and a detection unit 173, as illustrated in FIG. 1.

When the sensor node executes the position detection mode, the calculation unit 171 may calculate an azimuth angle and a slope of the sensor node, based on a magnetic values measured by the 2-axis magnetic sensor 110 and a acceleration values measured by the 3-axis acceleration sensor 120. In other words, when the sensor node is initially installed or is moved, the calculation unit 171 may calculate the azimuth angle and the slope of the sensor node.

The sensor control unit 172 may transfer the magnetic values and the acceleration values to the calculation unit 171, without a change in the magnetic values and the acceleration values, so that the calculation unit 171 may calculate the azimuth angle and the slope of the sensor node. When the azimuth angle and the slope are calculated by the calculation unit 171, the sensor control unit 172 may change the position detection mode to the target detection mode, may filter the magnetic values and the vibration values, may amplify the filtered magnetic values and the filtered vibration values, and may transfer the amplified magnetic values and the amplified vibration values to the detection unit 173. Accordingly, the detection unit 173 may detect a change in a magnetic field formed around the sensor node, or detect whether vibration occurs.

An example in which the sensor control unit 172 controls the magnetic values and the vibration value will be further described with reference to FIG. 2.

Additionally, the sensor control unit 172 may align directions of sensors based on the azimuth angle and the slope calculated by the calculation unit 171. Here, the sensors may be used to perform monitoring in a predetermined direction, and may include, for example the cameras 130 or the IR sensors 140. Specifically, the sensor control unit 172 may control directions and angles of the cameras 130, and directions and angles of the IR sensors 140 to be aligned, based on the calculated azimuth angle and the calculated slope, and may determine which direction the cameras 130 and the IR sensors 140 perform monitoring. The sensor control unit 172 may control alignment of sensors in the sector antenna 150 based on the calculated azimuth angle, and may also control a beam pattern of the sector antenna 150, or a beam pattern of the radial direction correction antenna 160, based on the calculated slope.

For example, the sensor control unit 172 may control a first sector of the sector antenna 150, the first camera 130, and the first IR sensor 140 to be aligned with either an x-axis or y-axis of the 2-axis magnetic sensor 110, and may determine which direction the first camera 130 and the first IR sensor 140 perform monitoring. Additionally, the sensor control unit 172 may perform wireless communication with a node or server corresponding to the first sector, using the sector antenna 150.

The sensor control unit 172 may control directions of the cameras 130, or directions of the IR sensors 140 based on the azimuth angle, so that the cameras 130 and the IR sensors 140 may perform monitoring in different directions, thereby preventing the cameras 130 and the IR sensors from monitoring the same area. Additionally, the sensor control unit 172 may control angles of the cameras 130, or angles of the IR sensors 140 based on the slope, thereby preventing the cameras 130 and the IR sensors 140 from monitoring the sky or the ground.

When the sensor node executes the target detection mode, the detection unit 173 may detect a target within a predetermined distance from the sensor node, based on images captured by the cameras 130, or based on at least one of values measured by the IR sensors 140, the 2-axis magnetic sensor 110, and the 3-axis acceleration sensor 120.

Figure 2:
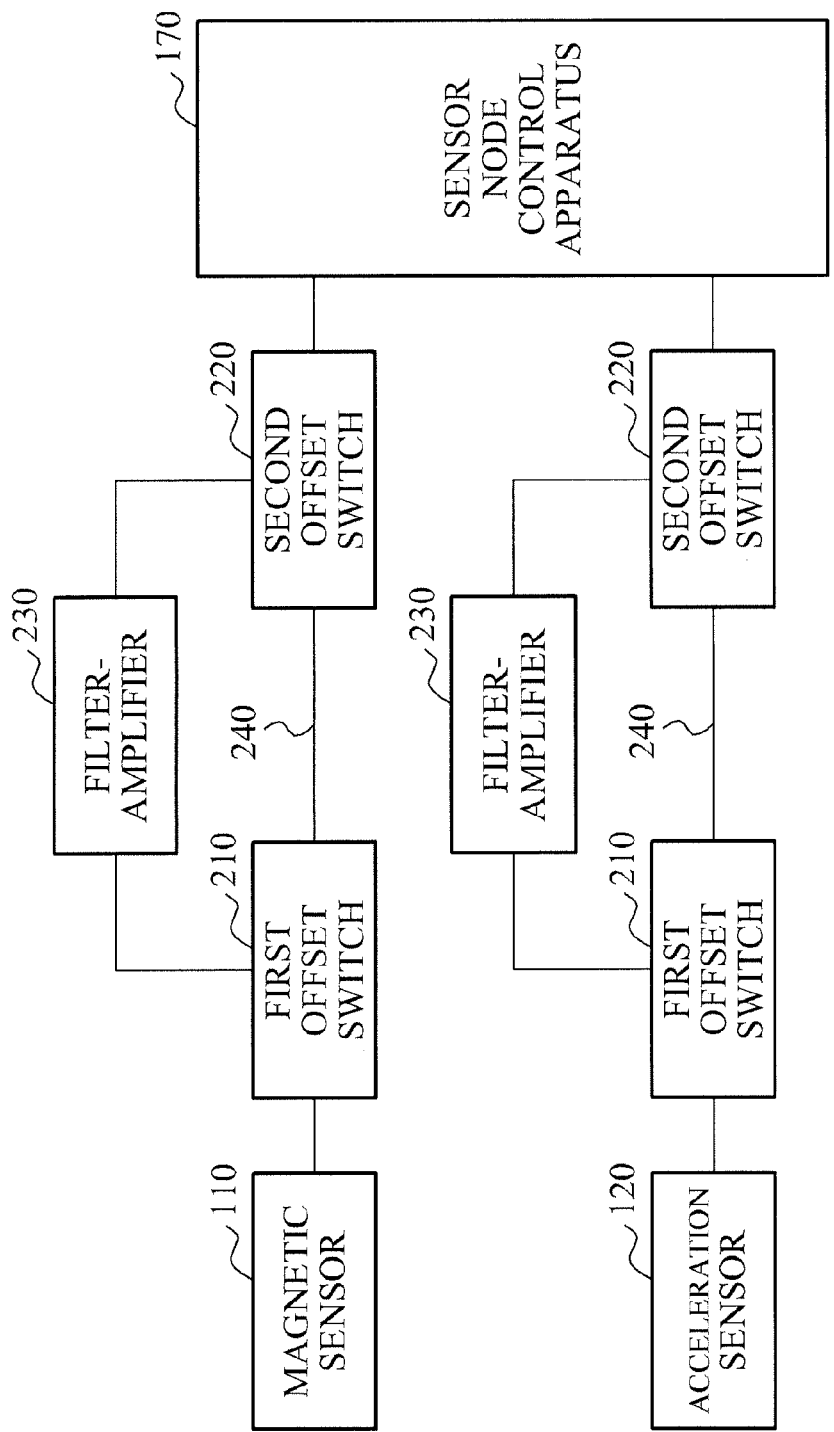
FIG. 2 is a diagram illustrating components used to control a magnetic values and a vibration value according to an embodiment of the present invention.

FIG. 2 is a diagram illustrating components used to control a magnetic values and a vibration value according to an embodiment of the present invention.

As illustrated in FIG. 2, a sensor node according to the present invention may include a pair of first offset switches 210, a pair of second offset switches 220, and a pair of filter-amplifiers 230.

The first offset switches 210 and the second offset switches 220 may be connected and operated with each other, and may enable a value measured by the 2-axis magnetic sensor 110 and a value measured by the 3-axis acceleration sensor 120 to pass through the filter-amplifiers 230, or to prevent the measured values from passing through the filter-amplifiers 230.

The filter-amplifiers 230 may remove unnecessary information from the measured values, by filtering the measured values, and may amplify the measured values from which the unnecessary information is removed. Accordingly, the detection unit 173 may facilitate detection of the target based on the amplified values.

To calculate the azimuth angle and the slope using the 2-axis magnetic sensor 110 and the 3-axis acceleration sensor 120, the calculation unit 171 may require an uncorrected magnetic values and an uncorrected acceleration values. However, when the uncorrected magnetic values and the uncorrected vibration values are used, the detection unit 173 may detect a wrong target by a value irrelevant to the target, or may fail to detect a change in the measured values.

Accordingly, the sensor control unit 172 may change the magnetic values and the vibration values depending on whether the azimuth angle and the slope are calculated, and may detect the vibration and the change in the magnetic field formed around the sensor node by using the 2-axis magnetic sensor 110 and the 3-axis acceleration sensor 120 that are used to calculate the azimuth angle and the slope.

Specifically, when the azimuth angle and the slope are calculated by the calculation unit 171, the sensor control unit 172 may control the first offset switches 210 and the second offset switches 220 to be directly connected to each other, as indicated by reference numeral 240 in FIG. 2, so that the magnetic values and the acceleration values may remain unchanged.

Conversely, when the detection unit 173 starts to detect the target based on the azimuth angle and the slope calculated by the calculation unit 171, the sensor control unit 172 may control the first offset switches 210 and the second offset switches 220 to be connected via the filter-amplifiers 230, respectively, so that the magnetic values and the vibration values may be filtered and amplified.

Figure 3:
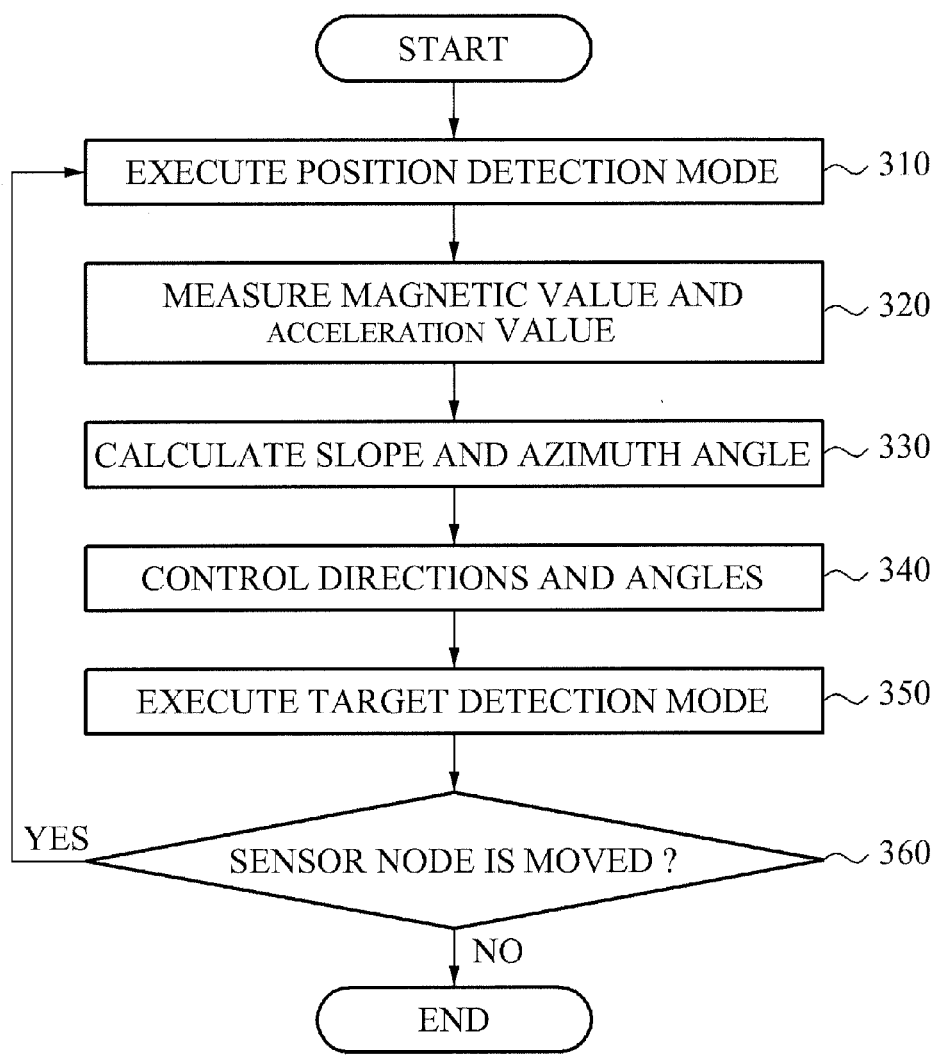
FIG. 3 is a flowchart illustrating a method for controlling a sensor node according to an embodiment of the present invention.

FIG. 3 is a flowchart illustrating a method for controlling a sensor node according to an embodiment of the present invention.

As illustrated in FIG. 3, when the sensor node is initially installed or is moved, the position detection mode may be executed in operation 310. Specifically, the sensor node may activate the 2-axis magnetic sensor 110, the 3-axis acceleration sensor 120, the sensor control unit 172, and the calculation unit 171. Here, the sensor control unit 172 may control the first offset switches 210 and the second offset switches 220 to be directly connected to each other, so that a magnetic values and a acceleration values may remain unchanged.

In operation 320, the 2-axis magnetic sensor 110 and the 3-axis acceleration sensor 120 may respectively measure a magnetic values and a acceleration values of a place in which the sensor node is located.

In operation 330, the calculation unit 171 may calculate an azimuth angle and a slope of the sensor node, based on the magnetic values and the acceleration values measured in operation 320.

In operation 340, the sensor control unit 172 may control the directions and angles of the cameras 130, and the directions and angles of the IR sensors 140 to be aligned based on the azimuth angle and the slope calculated in operation 330. Additionally, the sensor control unit 172 may control alignment of sensors in the sector antenna 150 based on the calculated azimuth angle, and may also control a beam pattern of the sector antenna 150, or a beam pattern of the radial direction correction antenna 160, based on the calculated slope.

Furthermore, the sensor control unit 172 may control the directions of the cameras 130, or the directions of the IR sensors 140 based on the azimuth angle, so that the cameras 130 or the IR sensors 140 may perform monitoring in different directions, thereby preventing the cameras 130 and the IR sensors from monitoring the same area. Also, the sensor control unit 172 may control the angles of the cameras 130, or the angles of the IR sensors 140 based on the slope, thereby preventing the cameras 130 and the IR sensors 140 from monitoring the sky or the ground.

In addition, the sensor control unit 172 may control the first offset switches 210 and the second offset switches 220 to be connected via the filter-amplifiers 230, respectively, so that the magnetic values and the vibration values may be filtered and amplified.

In operation 350, the sensor node may execute the target detection mode, and may determine whether a target exists around the sensor node. Specifically, the detection unit 173 may detect the target within a predetermined distance from the sensor node, based on information measured by at least one of the cameras 130 and IR sensors 140 that are controlled in operation 340.

In operation 360, whether the sensor node is moved may be determined. Specifically, the sensor node may determine whether a location of the sensor node is changed, based on information measured by the 2-axis magnetic sensor 110, the 3-axis acceleration sensor 120, and the cameras 130. When the sensor node is moved, the method of FIG. 3 may revert to operation 310 to execute the position detection mode.

According to embodiments the present invention, it is possible to measure a direction and a slope of a sensor node using a 2-axis magnetic sensor and a 3-axis acceleration sensor, and to align directions and slopes of sensors based on the measured direction and the measured slope. Additionally, it is possible to detect vibration, and a change in a magnetic field around the sensor node using the 2-axis magnetic sensor and the 3-axis acceleration sensor, by calculating an azimuth angle and a slope of the sensor node, as well as, by determining whether to filter and amplify a magnetic values and a vibration values.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for controlling a sensor node, the apparatus comprising:
   a calculator to calculate an azimuth angle and a slope of the sensor node, based on magnetic values measured by a 2-axis magnetic sensor and vibration values measured by a 3-axis acceleration sensor, at least one of a direction and an angle of the sensor node being controlled based on the calculated azimuth angle and the slope;
   a sensor controller to control selective filtering of the magnetic values and the vibration values and selective amplification of the filtered magnetic values and the filtered vibration values, when the azimuth angle and the slope are calculated;
   a first offset switch which receives at least one of the magnetic values measured by the 2-axis magnetic sensor and the vibration values measured by the-axis acceleration sensor, from the 2-axis magnetic sensor and the 3-axis acceleration sensor, respectively;
   a second offset switch which outputs, according to a first connection, at least one of magnetic values and vibration values received by the first offset switch to the calculator, or, according to a second connection, outputs at least one of filtered and amplified magnetic values and filtered and amplified vibration values to a detector; and
   the detector to detect a target relative to the sensor node based on filtered and amplified magnetic values and filtered and amplified vibration values which are output by the second offset switch,
   wherein the sensor controller determines whether or not to have the magnetic values and the vibration values received by the first offset switch to be filtered and amplified, and based on the determination selectively controls the first and second offset switches to be connected according to one of the first connection and the second connection,
   wherein in the first connection the first and second offset switches are directly connected to one another such that at least one of the magnetic values and the vibration values measured by the 2-axis magnetic sensor and 3-axis acceleration sensor, respectively, pass through the first offset switch directly to the second offset switch, and in the second connection the first and second offset switches are indirectly connected to one another, such that at least one of the magnetic values and the vibration values measured by the 2-axis magnetic sensor and 3-axis acceleration sensor, respectively, pass through the first offset switch to a filter-amplifier and the second offset switch outputs at least one of filtered and amplified magnetic values and filtered and amplified vibration values to the detector.

2. An apparatus for controlling a sensor node, the apparatus comprising:
   a calculator to calculate an azimuth angle and a slope of the sensor node, based on magnetic values measured by a 2-axis magnetic sensor and vibration values measured by a 3-axis acceleration sensor;
   a sensor controller to control selective filtering of the magnetic values and the vibration values and selective amplification of the filtered magnetic values and the filtered vibration values, when the azimuth angle and the slope are calculated;
   a filter-amplifier which selectively filters the magnetic values and the vibration values measured by the 2-axis magnetic sensor and 3-axis acceleration sensor, respectively, according to a control by the sensor controller, and to amplify the filtered magnetic values and the filtered vibration values;
   an offset switch, which according to a control by the sensor controller, either bypasses the filter-amplifier and outputs at least one of the magnetic values and the vibration values measured by the 2-axis magnetic sensor and 3-axis acceleration sensor, respectively, or passes at least one of the magnetic values and the vibration values measured by the t-axis magnetic sensor and 3-axis acceleration sensor, respectively, through the filter-amplifier and outputs at least one of filtered and amplified magnetic values and filtered and amplified vibration values; and
   a detector to detect a target based on filtered and amplified magnetic values and filtered and amplified vibration values output by the offset switch.

3. The apparatus of claim 2, wherein, when the sensor node is moved or is initially installed, the calculator calculates the azimuth angle of the sensor node.

4. The apparatus of claim 3, wherein, when the sensor node is moved or is initially installed, the sensor controller controls the offset switch to prevent the magnetic values and the acceleration values measured by the 2-axis magnetic sensor and 3-axis acceleration sensor, respectively, from passing through the filter-amplifier.

5. The apparatus of claim 2, wherein, when the azimuth angle and the slope are calculated, the sensor controller controls the offset switch so that the magnetic values and the vibration values measured by the 2-axis magnetic sensor and 3-axis acceleration sensor, respectively, pass through the filter-amplifier.

6. The apparatus of claim 1, wherein the sensor controller aligns a direction or an angle of at least one of an infrared ray (IR) sensor, a camera, a sector antenna, and a radial direction correction antenna, based on the azimuth angle and the slope.

7. The apparatus of claim 6, wherein the sensor controller controls directions or angles of a plurality of cameras, or controls directions or angles of a plurality of IR sensors, based on the azimuth angle and the slope, so that the plurality of cameras or the plurality of IR sensors perform monitoring different directions.

8. The apparatus of claim 6, wherein the sensor controller controls, based on the slope, a beam pattern of the sector antenna, or a beam pattern of the radial direction correction antenna.

9. An apparatus for controlling a sensor node, the apparatus comprising:
   a calculator to calculate an azimuth angle and a slope of the sensor node, based on magnetic values measured by a 2-axis magnetic sensor and vibration values measured by a 3-axis acceleration sensor, at least one of a direction and an angle of the sensor node being controlled based on the calculated azimuth angle and the slope;
   a sensor controller to control selective filtering of the magnetic values and the vibration values and selective amplification of the filtered magnetic values and the filtered vibration values, when the azimuth angle and the slope are calculated;
   an offset switch, which according to a control by the sensor controller, either passes at least one of the magnetic values and the vibration values measured by the 2-axis magnetic sensor and 3-axis acceleration sensor, respectively, through a filter-amplifier and to outputs at least one of filtered and amplified magnetic values and filtered and amplified vibration values to a detector, or bypasses the filter-amplifier and outputs at least one of the magnetic values and the vibration values measured by the 2-axis magnetic sensor and 3-axis acceleration sensor, respectively, to the calculator; and
   the detector to detect a target based on filtered and amplified magnetic values and filtered and amplified vibration values output by the offset switch,
   wherein the sensor controller aligns a direction or an angle of at least one of an infrared ray (IR) sensor, a camera, a sector antenna, and a radial direction correction antenna, based on the azimuth angle and the slope,
   wherein the detector detects the target, based on a value measured by the IR sensor and an image captured by the camera.

10. A method for controlling a sensor node, the method comprising:
   calculating an azimuth angle and a slope of the sensor node, based on magnetic values measured by a 2-axis magnetic sensor and vibration values measured by a 3-axis acceleration sensor, at least one of a direction and an angle of the sensor node being controlled based on the calculated azimuth angle and the slope;
   receiving, by a first offset switch among a pair of offset switches, magnetic values and vibration values measured by the 2-axis magnetic sensor and the 3-axis acceleration sensor, respectively,
   determining whether or not to filter the magnetic values and the vibration values received by the first offset switch;
   controlling, based on the determining, the pair of offset switches to be directly connected to one another, receiving by a second offset switch among the pair of offset switches from the first offset switch, the magnetic values and the vibration values received by the first offset switch, and outputting, by the second offset switch, at least one of the magnetic values and the vibration values received from the first offset switch to the calculator, or
   controlling the pair of offset switches to be indirectly connected to one another via a filter-amplifier, filtering, by the filter-amplifier, at least one of the magnetic values and the vibration values received by the first offset switch, and outputting, by the second offset switch, at least one of the filtered magnetic values and the filtered vibration values to a detector;

amplifying the filtered magnetic values and the filtered vibration values, using the filter-amplifier; and detecting a target relative to the sensor node based on filtered and amplified magnetic values and filtered and amplified vibration values.

11. The method of claim 10, wherein the calculating comprises, when the sensor node is moved or is initially installed, calculating the azimuth angle of the sensor node.

12. The method of claim 10, wherein the calculating comprises, when the sensor node is moved or is initially installed, calculating the azimuth angle and the slope, based on the magnetic values and the acceleration values, prior to the filtering.

13. The method of claim 10, further comprising:

aligning a direction or an angle of at least one of an infrared ray (IR) sensor, a camera, a sector antenna, and a radial direction correction antenna, based on the azimuth angle and the slope.

14. The method of claim 13, wherein the aligning comprises controlling directions or angles of a plurality of cameras, or controlling directions or angles of a plurality of IR sensors, based on the azimuth angle and the slope, so that the plurality of cameras or the plurality of IR sensors perform monitoring in different directions.

15. The method of claim 13, wherein the aligning comprises controlling, based on the slope, a beam pattern of the sector antenna, or a beam pattern of the radial direction correction antenna.

16. The method of claim 13, wherein the detecting comprises detecting the target, based on a value measured by the IR sensor and an image captured by the camera.

17. The apparatus of claim 1, wherein when the sensor node is moved or is initially installed the sensor node executes a position detection mode and activates the 2-axis magnetic sensor, the 3-axis acceleration sensor, the sensor controller, and the calculator, and when the sensor controller determines to have the magnetic values and the vibration values received by the first offset switch to be filtered, the sensor controller controls the first offset switch to be indirectly connected to the second offset switch, and the sensor node executes a target detection mode and the detector detects the target in the target detection mode.

18. The apparatus of claim 17, wherein when the sensor node is moved and the sensor node determines that a location of the sensor node has changed while in the target detection mode, the sensor node reverts to the position detection mode.

* * * * *